United States Patent
Coerlin et al.

(10) Patent No.: US 8,748,054 B2
(45) Date of Patent: Jun. 10, 2014

(54) METHOD FOR SUPPLYING FUEL GAS TO A GAS CHAMBER OF A FUEL CELL AND FUEL CELL

(75) Inventors: Detlev Coerlin, Erlangen (DE); Herdith Grete Gabriele Coerlin, legal representative, Erlangen (DE); Walter Stühler, Hirschaid (DE); Ottmar Voitlein, Lonnerstadt (DE)

(73) Assignee: Siemens Aktiengesellschaft, München (DE)

( * ) Notice: Subject to any disclaimer, the term of this patent is extended or adjusted under 35 U.S.C. 154(b) by 1677 days.

(21) Appl. No.: 11/922,840

(22) PCT Filed: Jun. 22, 2006

(86) PCT No.: PCT/EP2006/063430
§ 371 (c)(1),
(2), (4) Date: Aug. 27, 2009

(87) PCT Pub. No.: WO2007/000404
PCT Pub. Date: Jan. 4, 2007

(65) Prior Publication Data
US 2010/0028726 A1   Feb. 4, 2010

(30) Foreign Application Priority Data
Jun. 28, 2005   (EP) .................................. 05013970.8

(51) Int. Cl.
*H01M 8/04*   (2006.01)

(52) U.S. Cl.
USPC ........................................................ 429/444

(58) Field of Classification Search
None
See application file for complete search history.

(56) References Cited

U.S. PATENT DOCUMENTS

| | | | |
|---|---|---|---|
| 6,680,136 B2 * | 1/2004 | Mieney et al. | 429/415 |
| 2004/0197610 A1 * | 10/2004 | Drunert | 429/13 |
| 2004/0229088 A1 | 11/2004 | Hayashi et al. | |
| 2005/0123813 A1 | 6/2005 | Matoba et al. | |

FOREIGN PATENT DOCUMENTS

WO   WO 2005/053075 A1   6/2005

* cited by examiner

*Primary Examiner* — Monica Huson
(74) *Attorney, Agent, or Firm* — Henry M Feiereisen LLC

(57) ABSTRACT

Mechanical stresses of the membrane of a fuel cell can be reduced by virtue of the fact that the supply of feed gas to a gas chamber of the fuel cell takes places, initially, by means of a first pressure increasing speed and then by means of a second pressure increasing speed. The first pressure increasing speed is slower than the second pressure increasing speed. Pressure surges are prevented in the membrane due to the lower pressure increasing speed in the first phase of the gas supply, and as a result, the life span of the membrane is increased.

10 Claims, 2 Drawing Sheets

METHOD FOR SUPPLYING FUEL GAS TO A GAS CHAMBER OF A FUEL CELL AND FUEL CELL

CROSS REFERENCE TO RELATED APPLICATIONS

This application is the U.S. National Stage of International Application No. PCT/EP2006/063430, filed Jun. 22, 2006 and claims the benefit thereof. The International Application claims the benefits of European application No. 05013970.8 filed Jun. 28, 2005, both of the applications are incorporated by reference herein in their entirety.

FIELD OF INVENTION

The invention relates to a method for supplying fuel gas to a gas chamber of a fuel cell and also a fuel cell.

BACKGROUND OF THE INVENTION

In a fuel cell, hydrogen and oxygen are typically combined to generate energy and heat in an electrochemical reaction, with water being produced as the sole byproduct. To that end, the hydrogen is ducted into an anode gas chamber and the oxygen into a cathode gas chamber of the fuel cell. The hydrogen can be fed to the anode gas chamber either as pure hydrogen or as a hydrogenous fuel gas. The oxygen can be supplied to the cathode gas chamber as pure oxygen or also, for example, in the form of air.

In order to activate the fuel cell, these fuel gases must be introduced into the as yet empty gas chambers of the fuel cell. A fuel gas is usually supplied to a gas chamber via a gas supply line which is connected to the gas chambers and into which is inserted a valve for switching the gas supply to the gas chamber on and off. If the gas supply line is connected to a gas supply facility, after the valve is opened the pressure in the gas chamber increases at a velocity that is dependent on the flow cross-section of the valve.

The increasing pressure in the gas chamber can cause the cell membrane to be subjected to mechanical stresses which can result in the cell membrane's being damaged or even to its failure. If the fuel cell is part of a fuel cell stack, a cell membrane failure of this kind can lead to the failure of the entire fuel cell stack.

SUMMARY OF INVENTION

It is therefore the object of the present invention to disclose a method for supplying fuel gas to a gas chamber of a fuel cell and a fuel cell which enable unacceptably high mechanical stresses on the cell membrane due to the gas supply to the gas chamber to be reliably avoided.

The object directed to the method is achieved according to the invention by a method as claimed in the claims. The object directed to the fuel cell is achieved according to the invention by a fuel cell as claimed in the claims. Advantageous embodiments are in each case the subject matter of the dependent claims.

To achieve said objects, the invention proceeds on the basis of the knowledge that a cell membrane reacts very sensitively to pressure surges and can be damaged by same. Pressure surges of this kind can occur in particular when there is a sudden buildup of gas pressure as the gas begins to be supplied to a gas chamber at a time when there is still only a small amount of gas in the gas chamber. It is therefore necessary to build up the pressure in the gas chamber slowly. This is particularly important when the gas is introduced into an evacuated gas chamber.

The gas supply lines and valves contained therein for the purpose of switching the gas supply on and off are typically embodied with a relatively large cross-section (e.g. DN25), since the entire gas volume flow necessary for the operation of the fuel cell at full load must be able to flow through said supply lines and valves with as small a pressure drop as possible. Because of the large cross-section, however, after the valves are opened at the time of switching on the gas supply, the fuel gases fill the gas chamber very quickly, as a result of which the cell membrane is exposed to pressure surges.

Supplying fuel gas at full load with a small pressure drop while at the same time avoiding pressure surges is possible if the fuel gas is supplied to the gas chamber initially at a first pressure increase velocity and subsequently at a second pressure increase velocity in the gas chamber, where the first pressure increase velocity is less than the second pressure increase velocity.

Selecting a smaller pressure increase velocity in the first phase of the gas supply to the gas chamber, when the cell membrane reacts particularly sensitively to pressure surges, enables pressure surges to be effectively prevented. The fuel gas can then be supplied to the gas chamber at a higher pressure increase velocity in the gas chamber only once a definable pressure level in the gas chamber has been exceeded. The second pressure increase velocity can be determined, for example, by a gas supply to the gas chamber with as small a pressure drop as possible, as is required for operation of the fuel cell at full load. As a result of avoiding pressure surges the mechanical stresses on the cell membrane are reduced and consequently the useful life of the membrane is also increased.

According to a first advantageous embodiment of the inventive method, the transition from the first pressure increase velocity to the second pressure increase velocity is accomplished in a single step, i.e. a switchover is effected directly from the lower to the higher pressure increase velocity.

According to an alternative embodiment of the inventive method, the transition from the first pressure increase velocity to the second pressure increase velocity takes place continuously.

Preferably, a pressure difference between the gas chambers of the fuel cell is measured and, as a function of said pressure difference, the pressure increase velocity is set in at least one of the gas chambers, preferably separately for the two gas chambers, such that a defined limit value for the pressure difference is not exceeded. As a result of this setting, high pressure differences can be avoided by selective adjustment of the fuel gas supply phases on both sides of the membrane, thereby leading to a further reduction in the mechanical stress on the membrane and consequently to a lengthening of the useful life of the membrane.

A fuel cell according to the invention has means for supplying fuel gas to a gas chamber of the fuel cell, said means being embodied in such a way that the pressure increase velocity in the gas chamber can be varied. This enables the fuel gas to be supplied to the gas chamber initially at a first pressure increase velocity and then at a second pressure increase velocity in the gas chamber, where the first pressure increase velocity is less than the second pressure increase velocity. Accordingly, the advantages already cited in connection with the inventive method can be achieved.

According to an advantageous embodiment of the inventive fuel cell, the means include a gas supply line into which a valve having a continuously variable flow cross-section, e.g. a ball valve, is connected for the purpose of varying the pressure increase velocity. As a result of varying the flow cross-section, the pressure drop across the valve can be controlled and consequently the pressure increase velocity in the gas chamber influenced in a particularly simple manner.

Alternatively, the means can include a gas supply line into which a first valve and a second valve are connected in parallel for the purpose of varying the pressure increase velocity, wherein the first valve has a smaller flow cross-section than the second valve. The second valve can be, for example, a control valve of large cross-section (e.g. DN25) that is typically connected into gas supply lines and via which the entire gas volume flow required for operation at full load can flow with a minimum pressure drop. Connected in parallel with the control valve as a starting valve or bypass valve in order to avoid pressure surges when the gas supply is first switched on, is the first valve having a small cross-section (e.g. DN2). The fuel gas can then be supplied to the gas chamber such that initially only the first valve having the small flow cross-section is opened, and only at a second stage, e.g. after a defined pressure level in the gas chamber has been exceeded, is the gas supplied with a large flow cross-section and correspondingly high pressure increase velocity in the gas chamber by opening of the control valve.

Preferably the fuel cell includes a device for measuring a pressure difference between the gas chambers of the fuel cell and for setting the pressure increase velocity in at least one of the two gas chambers as a function of said pressure difference such that a defined limit value for the pressure difference is not exceeded. In this way unacceptably high pressure differences at the cell membrane and, associated therewith, mechanical stresses on the cell membrane can be avoided and consequently the useful life of the membrane can be extended. The pressure increase velocity is preferably set separately for the individual gas chambers.

BRIEF DESCRIPTION OF THE DRAWINGS

The invention and further advantageous embodiments of the invention according to features of the dependent claims are explained in more detail below with reference to exemplary embodiments and the accompanying figures, in which:

FIG. 2 shows a graphical representation of the progression of the pressure and the pressure increase velocity in the gas chambers of the fuel cell depicted in FIG. 1 at the time the gas supply to the fuel cell is switched on.

DETAILED DESCRIPTION OF INVENTION

Figure 1:
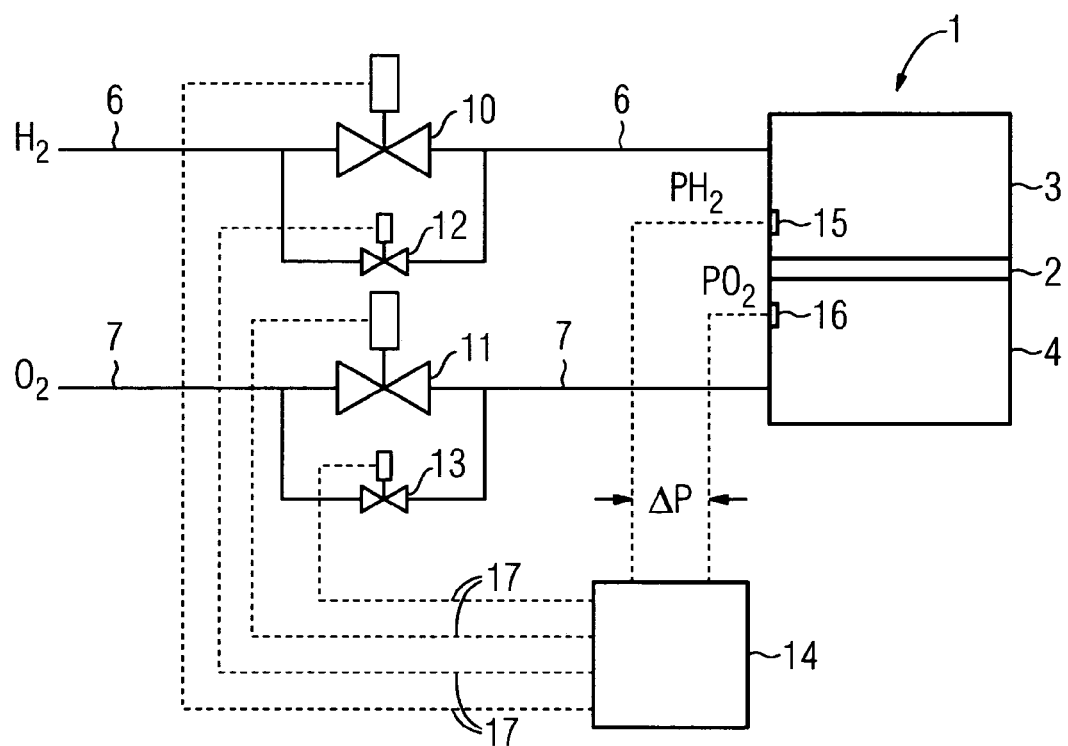
FIG. 1 shows a fuel cell according to the invention.

FIG. 1 is a schematic diagram depicting a fuel cell 1 of a fuel cell system that is not shown in further detail. The fuel cell 1 has a cell membrane 2 having an adjoining anode gas chamber 3 on one side of the cell membrane and an adjoining cathode gas chamber 4 on the other side of the cell membrane 2. Hydrogen $H_2$ is supplied to the anode gas chamber 3 via a gas supply line 6 and oxygen $O_2$ is supplied to the cathode gas chamber 4 via a gas supply line 7. Connected into the gas supply line 6 is a valve 10 having a suitably large cross-section for supplying gas to the anode gas chamber 3 during normal operation of the fuel cell 1. The entire gas volume flow required for operation at full load can flow via the valve 10 with a minimum pressure drop.

Additionally connected into the gas supply line 6 in parallel with the valve 10 is a valve 12 having a smaller flow cross-section. This latter valve serves as a starting or bypass valve for the fuel gas supply at the time the fuel cell 1 is started.

A valve 11 having a larger flow cross-section and, parallel thereto, a valve 13 having a smaller flow cross-section are connected into the gas supply line 7 for the oxygen $O_2$ in a corresponding manner.

The fuel cell 1 further comprises a device 14 for measuring a pressure difference $\Delta P$ between the gas chambers 3, 4. For this purpose the device 14 is coupled to pressure sensors 15, 16 in the gas chambers 3, 4, the pressure sensor 15 measuring the pressure $PH2$ of the hydrogen $H_2$ in the anode gas chamber 3 and the pressure sensor 16 measuring the pressure $PO2$ of the oxygen $O_2$ in the anode gas chamber 4. By means of the device 14 the valves 10, 11, 12, 13 can be opened or closed independently of one another by way of control lines 17.

Figure 2:
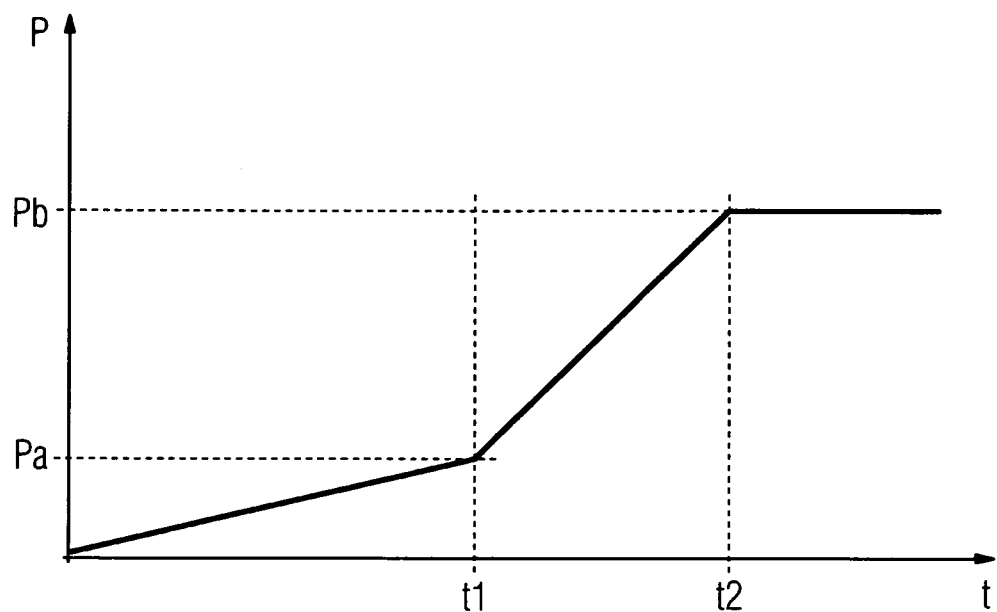
Figure 2:
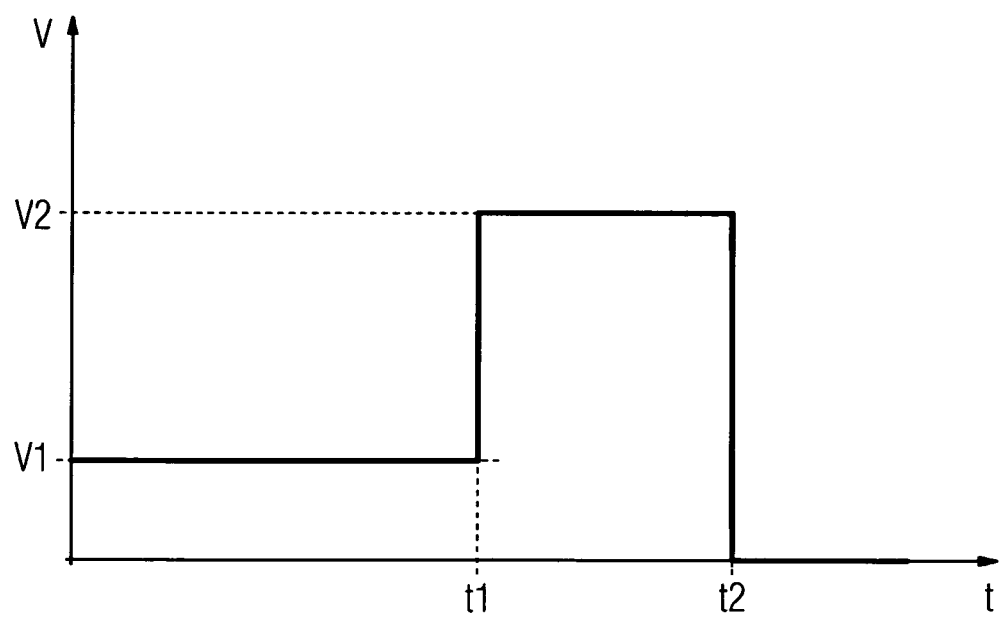

The method for supplying the fuel gases to the fuel cell 1 when the fuel cell is activated is explained below with reference to FIG. 2. FIG. 2 shows firstly, in an upper diagram, the progression of the pressure P in the gas chambers 3, 4 of the fuel cell 1 over time t and secondly, in a lower diagram, the progression of the pressure increase velocity V in the gas chambers 3, 4 of the fuel cell 1 over time t.

At the start of the switching-on operation, only the valves 12 and 13 having a small flow cross-section are opened, while the valves 10 and 11 having a larger flow cross-section remain closed. Owing to the small flow cross-sections and the associated pressure drop at the valves 12 and 13 the supply of the fuel gases $H_2$, $O_2$ to the gas chambers 3 and 4 is effected at a corresponding low pressure and consequently also at a low pressure increase velocity V1 in the gas chambers 3, 4.

After the pressure Pa has been reached in the gas chambers 3, 4 at time t1, the valves 10, 11 having a large cross-section are opened in addition. The fuel gases $H_2$, $O_2$ are accordingly supplied to the gas chambers 3, 4 at a higher pressure, as a result of which the pressure increase velocity in the gas chambers 3, 4 increases to the value V2. Once the final pressure Pb is reached at time t2, the pressure in the gas chambers ceases to increase any further.

As a result of setting the lower pressure increase velocity V1 at the time the fuel gases $H_2$, $O_2$ begin being supplied to the gas chambers, mechanical loads on the cell membrane 2 caused by pressure surges are largely avoided. Only when the pressure in the gas chambers 3, 4 has reached a predefined value Pa, as of which point the risk of pressure surges is reduced, will a higher pressure increase velocity V2 be allowed. In this way the mechanical stress on the cell membrane 2 when the gas starts to be supplied is reduced and consequently the cell membrane's useful life is extended.

In addition, the pressure difference $\Delta P$ between the gas chambers 3, 4 can be measured by means of the device 14 and, as a function of said pressure difference $\Delta P$, the respective pressure increase velocity can be set separately for the two gas chambers 3, 4 such that a defined limit value for the pressure difference $\Delta P$ is not exceeded. The pressure increase velocity is set by opening or closing of the valves 10, 11, 12, 13.

Since the pressure difference between the two gas chambers 3, 4 does not exceed a specific limit value, mechanical stresses on the membrane can be kept within certain limits and consequently the useful life of the membrane can be extended.

As explained in the foregoing, the method according to the invention can be applied when fuel gases are supplied to the two gas chambers of a fuel cell, e.g. when both gas chambers are evacuated. Basically, however, the method according to the invention can also be used when fuel gas is supplied to only one of the gas chambers of a fuel cell, e.g. when the other gas chamber is already filled with gas.

The method according to the invention can also be used for supplying gas to all the fuel cells of a fuel cell stack or fuel cell block.

If all fuel cells of a fuel cell stack or fuel cell block are supplied with a fuel gas via a single gas supply line, in the case of the fuel cell according to the invention the means for varying the pressure increase velocity can also be used to adjust the pressure increase in the corresponding gas chambers of all further fuel cells of the fuel cell stack or fuel cell block.

Moreover, the fuel cell according to the invention or, as the case may be, the method according to the invention can essentially also be used in reverse sequence in order to avoid pressure surges and pressure differences and consequently mechanical loads on the membrane when the gas is being discharged from the fuel cell, i.e. the fuel gas is discharged from a gas chamber initially at a first pressure increase velocity and then at a second pressure increase velocity, where the first pressure increase velocity is greater than the second pressure increase velocity.

The invention claimed is:

1. A method for supplying operating gas to an anode gas chamber and a cathode gas chamber of a fuel cell, wherein the fuel cell further comprises a cell membrane between the anode gas chamber and the cathode gas chamber, wherein the operating gas includes a first operating gas supplied to the cathode chamber and a second operating gas supplied to an anode chamber, the method comprising:
   initially supplying the first operating gas to the cathode gas chamber at a first pressure increase velocity, when the pressure in the cathode gas chamber is below a predetermined value; and
   subsequently supplying the first operating gas to the cathode gas chamber at a second pressure increase velocity when the pressure in the cathode gas chamber exceeds said predetermined value, wherein first pressure increase velocity is less than the second pressure increase velocity,
   such that mechanical stresses on the cell membrane are reduced.

2. The method as claimed in claim 1, wherein the transition from the first pressure increase velocity to the second pressure increase velocity is accomplished in a single step.

3. The method as claimed in claim 1, wherein the transition from the first pressure increase velocity to the second pressure increase velocity takes place continuously.

4. The method as claimed in claim 2, wherein a pressure difference between the anode gas chamber and the cathode gas chamber of the fuel cell is measured and, as a function of the pressure difference, the pressure increase velocity is set in at least one of the gas chambers such that a defined limit value for the pressure difference is not exceeded.

5. The method as claimed in claim 3, wherein a pressure difference between the anode gas chamber and the cathode gas chamber of the fuel cell is measured and, as a function of the pressure difference, the pressure increase velocity is set in at least one of the gas chambers such that a defined limit value for the pressure difference is not exceeded.

6. The method as claimed in claim 4, wherein the pressure increase velocity is set by adjustment of the flow cross-section in a gas supply line to the cathode gas chamber.

7. A fuel cell, comprising:
   a cathode gas chamber, an anode gas chamber and a cell membrane between the cathode and anode gas chambers; and
   a variable gas supply that supplies a first operating gas to the cathode gas chamber of the fuel cell, wherein the gas supply is constructed and arranged such that a pressure increase velocity in the cathode gas chamber is variable, in order to reduce mechanical stresses on the cell membrane, wherein the variable gas supply line is operable to:
   initially supply the first operating gas to the cathode gas chamber at a first pressure increase velocity when the pressure in the cathode gas chamber is below a predetermined value; and
   subsequently supply the first operating gas to the cathode gas chamber at a second pressure increase velocity when the pressure in the cathode gas chamber exceeds said predetermined value, wherein first pressure increase velocity is less than the second pressure increase velocity.

8. The fuel cell as claimed in claim 7, wherein the variable gas supply includes a gas supply line connected to a valve having a continuously variable flow cross-section that varies the pressure increase velocity.

9. The fuel cell as claimed in claim 7, wherein the variable gas supply includes a gas supply line into which a first valve and a second valve are connected in parallel for the purpose of varying the pressure increase velocity, the first valve having a smaller flow cross-section than the second valve.

10. The fuel cell as claimed in claim 7, further comprising a pressure difference device for measuring a pressure difference between the anode gas chamber and cathode gas chamber and for adjusting the pressure increase velocity in at least one of the gas chambers as a function of the pressure difference such that a defined limit value for the pressure difference is not exceeded.

* * * * *